(12) United States Patent
Doushita et al.

(10) Patent No.: US 6,767,612 B2
(45) Date of Patent: Jul. 27, 2004

(54) MAGNETIC RECORDING MEDIUM

(75) Inventors: Hiroaki Doushita, Odawara (JP); Takeshi Harasawa, Odawara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 55 days.

(21) Appl. No.: 10/201,908

(22) Filed: Jul. 25, 2002

(65) Prior Publication Data

US 2004/0076855 A1 Apr. 22, 2004

(30) Foreign Application Priority Data

Jul. 30, 2001 (JP) .......... 2001-229023
Nov. 26, 2001 (JP) .......... 2001-359063

(51) Int. Cl.$^7$ .............. G11B 5/706
(52) U.S. Cl. .............. 428/141; 428/694 BH; 428/694 BR
(58) Field of Search .......... 428/141, 694 BH, 428/694 BR

(56) References Cited

U.S. PATENT DOCUMENTS 5,508,117 A * 4/1996 Kawamata et al. ......... 428/610
5,737,159 A * 4/1998 Nakamura et al. .......... 360/135
5,989,680 A * 11/1999 Wakana et al. ............ 428/141

* cited by examiner

Primary Examiner—Stevan A. Resan
(74) Attorney, Agent, or Firm—Sughrue Mion, PLLC

(57) ABSTRACT

Provided is a particulate magnetic recording medium affording great improvement in medium noise in a recording and reproduction system adopting MR heads. The magnetic recording medium comprises a nonmagnetic layer comprising a nonmagnetic powder and a binder and a magnetic layer comprising a hexagonal ferrite powder and a binder in this order on a nonmagnetic support. The number of pits having a depth of ⅓ or more of the minimum recording bit length present on a surface of said magnetic layer is equal to or less than $100/10000 \, \mu m^2$, and the center surface average roughness of said magnetic layer surface SRa is equal to or less than 6.0 nm.

11 Claims, No Drawings

MAGNETIC RECORDING MEDIUM

FIELD OF THE INVENTION

The present invention relates to a particulate magnetic recording medium with high recording density. More specifically, the present invention particularly relates to a magnetic recording medium comprising a nonmagnetic layer and a magnetic layer comprising a hexagonal ferrite ferromagnetic powder in this order, which is suited to a magnetic recording and reproducing system in which an MR head is adopted.

BACKGROUND OF THE INVENTION

In the field of magnetic recording disks, 2 MB MF-2HD floppy disks employing Co-modified iron oxide have been mounted normally in personal computers. However, today, with the rapid increase in the volume of data handled, the capacity of such disks is inadequate and there is a need for the development of high-capacity floppy disks. On the other hand, in the field of magnetic tapes, with the widespread popularity of office computers such as minicomputers, personal computers, and work stations in recent years, a large amount of research has been conducted into magnetic recording tapes (so-called "back-up tapes") used to record computer data as an external memory medium. In the practical implementation of magnetic recording tapes for such applications, particularly as the size of computers has decreased and information processing capability has increased, there had been strong demand for an increase in recording capacity to achieve high-capacity recording and size reduction.

Further, magnetic heads operating on the principle of electromagnetic induction (inductive magnetic heads) have been widely employed in recording and reproduction systems employing magnetic recording media. However, limits to the use of inductive magnetic heads in the range of even higher density recording are problematic. That is, obtaining high reproduction output requires increasing the number of windings in the coil of the reproduction head. However, when the number of coil windings is increased, inductance increases, which ends up increasing resistance at high frequency. This results in the problem of decreased reproduction output.

In light of this state of affairs, recording and reproduction magnetoresistive (MR) heads operating on the principle of magnetoresistance have been recently developed and put to use on hard disk devices and the like.

In addition, application of MR heads to magnetic tapes has also been studied. Employing MR heads in a magnetic tape recording and reproduction system yields several times the reproduction output of inductive magnetic heads, and since inductive coils are not employed, device noise such as impedance noise can be greatly reduced. Thus, the use of MR heads can reduce the noise of the magnetic recording medium itself, making it possible to achieve a high SN ratio. That is, the magnetic recording medium noise that was previously concealed in device noise is reduced, permitting good recording and reproduction and greatly improved high-density recording characteristics.

Accordingly, magnetic recording media in the form of magnetic tapes have recently been proposed (Japanese Unexamined Patent Publication (KOKAI) Nos. Heisei 8-227517 and 2001-84549).

Japanese Unexamined Patent Publication (KOKAI) No. 2001-84549 discloses a magnetic recording medium manufactured by a method of inhibiting error generation in a linear serpentine type recording and reproduction system by evaluating the pits on the medium surface by optical interference roughness meter and limiting the number of pits to a specified level.

However, since the magnetic head employed in this magnetic recording medium is an inductive head, it cannot adequately resolve the problem of decreasing noise in MR heads designed for use in high-density recording. Accordingly, there is a need for the development of a technique that is capable of resolving the problem of reducing medium noise when employing MR heads from the magnetic recording medium side.

Thus, the present invention was devised in light of the above-described problems, and it is an object of the present invention to provide a particulate magnetic recording medium affording great improvement in medium noise in a recording and reproduction system adopting MR heads.

The present inventors conducted extensive research into the spacing between heads and magnetic tapes in magnetic recording and reproduction systems adopting MR heads, resulting in the discovery that pits of a certain depth on the magnetic layer surface have a marked effect on noise; the present invention was devised on that basis.

SUMMARY OF THE INVENTION

That is, the object of the present invention is achieved by a magnetic recording medium comprising a nonmagnetic layer comprising a nonmagnetic powder and a binder and a magnetic layer comprising a hexagonal ferrite powder and a binder in this order on a nonmagnetic support, characterized in that the number of pits having a depth of ⅓ or more of the minimum recording bit length present on a surface of said magnetic layer is equal to or less than $100/10000 \, \mu m^2$, and the center surface average roughness of said magnetic layer surface SRa is equal to or less than 6.0 nm.

On said magnetic layer surface, the number of pits having a depth as measured by Atomic Force Microscope (AFM) of 50 nm or more is preferably equal to or less than $100/10000 \, \mu m^2$.

The magnetic recording medium of the present invention can be employed for the following magnetic recording and reproducing system;

A magnetic recording and reproducing system which is a magnetic recording and reproducing system employing a magnetic recording medium comprising a nonmagnetic power and a binder and a magnetic layer comprising a hexagonal ferrite powder and a binder in this order on a nonmagnetic support, wherein an MR head is employed for reproducing a signal, and said magnetic recording medium is characterized in that the number of pits having a depth of ⅓ or more of the minimum recording bit length present on a surface of said magnetic layer is equal to or less than $100/10000 \, \mu m^2$, and the center surface average roughness of said magnetic layer surface SRa is equal to or less than 6.0 nm.

By controlling the surface roughness of the magnetic layer within the above-mentioned range, medium noises can be reduced during reproducing by an MR head.

Further, preferred modes of the present invention are as follows;

(1) The magnetic recording medium in which said nonmagnetic layer comprises at least carbon black and a binder composed of a radiation-setting resin and a thermosetting resin.

(2) The magnetic recording medium employed for a magnetically recording and reproducing system in which an MR head is adopted.

Modes of implementing the invention are described in detail below.

The magnetic recording medium of the present invention is characterized in that the number of pits having a depth of 1/3 or more of the minimum recording bit length present on a surface of the magnetic layer is equal to or less than 100/10,000 $\mu m^2$ and the center surface average roughness SRa of the magnetic layer surface is equal to or less than 6.0 nm.

The magnetic recording medium of the present invention is desirably characterized in that the number of pits having a depth of 50 nm or more as measured by atomic force microscope (AFM) on the magnetic layer surface is equal to or less than 100/10,000 $\mu m^2$.

The depth of pits on the magnetic layer surface is the distance from the average plane (the plane where the volume of protrusions and the volume of pits in the measurement surface are equal) of magnetic layer surface roughness to the deepest portion of the pit when three-dimensional surface roughness is measured with Nanoscope III made by Digital Instruments in U.S.A.

Pits on the magnetic layer surface are presumed to compromise contact conditions between the MR head and the magnetic tape and to be related to noise. That is, it is thought that when there are pitted portions of prescribed depth on the magnetic layer surface, contact conditions between the MR head and the magnetic tape are compromised and output decreases locally in areas in which spacing loss in the pitted portions is substantial. In common magnetic tapes, foreign substances and protrusions on the magnetic layer surface are removed to some extent by surface processing such as cleaning and polishing. However, since pits on the magnetic layer surface cannot be removed, when the number of pits having a certain depth or more exceeds a certain number, they are thought to increase noise during reproduction by MR heads.

The number of pits having a depth of 1/3 or more of the minimum recording bit length present on the magnetic layer surface of the present invention is equal to or less than 100/10,000 $\mu m^2$, preferably equal to or less than 80 pits/10,000 $\mu m^2$, and more preferably equal to or less than 50 pits/10,000 $\mu m^2$. When pits having a depth of 1/3 or more of the minimum recording bit length are present in large number on the magnetic layer surface, local spacing loss between the head cap and the magnetic tape becomes large, causing an increase in medium noise. Accordingly, reducing the number of pits having a depth of 1/3 or more of the minimum recording bit length present on the magnetic layer surface to equal to or less than 100/10,000 $\mu m^2$ can reduce the portions causing spacing loss and effectively reduce medium noise.

The "minimum recording bit length" means 1/2 of the length of the shortest wavelength of the signal recorded by the system. Although this length differs by system, it is usually about 50 to 500 nm.

The number of pits having a depth of 50 nm or more as measured by an atomic force microscope (AFM) on the magnetic layer surface in the present invention is desirably equal to or less than 100/10,000 $\mu m^2$, more preferably equal to or less than 80 pits/10,000 $\mu m^2$, and still more preferably equal to or less than 50 pits/10,000 $\mu m^2$. When numerous pits having a depth of 50 nm or more are present on the magnetic layer surface, the spacing loss between the head cap and the magnetic tape becomes large, causing an increase in medium noise. Accordingly, reducing the number of pits having a depth of 50 nm or more as measured by an atomic force microscope (AFM) on the magnetic layer surface to equal to or less than 100/10,000 $\mu m^2$ can decrease portions causing the spacing loss and effectively reduce medium noise.

Further, the center surface average roughness SRa of the magnetic layer surface of the present invention is equal to or less than 6.0 nm, preferably ranging from 1.0 to 5.0 nm, and more preferably ranging from 1.5 to 4.5 nm. When the center surface average roughness SRa is equal to or less than 6.0 nm, the amplitude of irregularities can be kept small, to reduce noise, as well as output deterioration can be kept low.

An example of a method of adjusting the number of pits having a depth of 1/3 or more of the minimum recording bit length and the number of pits having a depth of 50 nm or more on the magnetic layer surface of the magnetic recording medium of the present invention is to adjust the type and quantity added of coarse particles (carbon black, abrasives and the like) in the backcoat layer. Further, examples of methods of adjusting the magnitude of center surface average roughness SRa of the magnetic layer surface are given below:

(1) Adjustment of the hardness of the nonmagnetic layer by changing the drying conditions and the like during coating, and using calendering of abrasives, aggregates, and the like contained in the magnetic layer to suitably embed them in the nonmagnetic layer;

(2) When employing abrasives in the step of preparing the magnetic layer coating material, separately dispersing the abrasives and pre-adjusting the degree of dispersion of the abrasives prior to adding them to the magnetic layer coating material to prepare a coating liquid; and (3) Adjusting the dispersion time.

Measurement of pits on the magnetic layer surface is conducted over a range of 100 $\mu m \times 100$ $\mu m$ (10,000 $\mu m^2$) with a Nanoscope III made by Digital Instruments in U.S.A. The number of pits is obtained by counting the number of pits having a depth of 1/3 or more of the minimum recording bit length in the measurement area, or by counting the number of pits having a depth of 50 nm or more. Center surface average roughness SRa can be obtained from the center surface average roughness [nm] within the above-stated measurement range.

The layer structure of the magnetic recording medium of the present invention will be described below.

In the magnetic recording medium of the present invention, two coating layers in the form of a nonmagnetic layer and a magnetic layer are provided in this order on at least one surface of a nonmagnetic support, and a backcoat layer is provided as needed on the opposite side of the nonmagnetic support.

Further, various coatings such as lubricant coatings and magnetic layer protective coatings can be provided as necessary on the magnetic layer in the magnetic recording medium of the present invention. Further, an undercoating layer (adhesion enhancing layer) can be provided with the objective of increasing adhesion between the coating and the nonmagnetic support on the side of the nonmagnetic support on which the nonmagnetic layer and magnetic layer are provided.

Magnetic Layer

The magnetic layer of the magnetic recording medium of the present invention comprises at least a hexagonal ferrite powder and a binder.

Hexagonal Ferrite Powder

Examples of hexagonal ferrite powders comprised in the magnetic layer of the present invention are various substitution products of barium ferrite, strontium ferrite, lead ferrite, and calcium ferrite, and Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods employed.

The particle size is, as a hexagonal plate diameter, 10 to 55 nm, preferably 10 to 45 nm, and more preferably 20 to 35 nm. Particularly when employing MR heads in reproduction for increasing track density, a plate diameter equal to or less than 55 nm is desirable to reduce noise. However, stable magnetization cannot be achieved due to thermal fluctuation at equal to or less than 10 nm. A hexagonal plate diameter equal to or less than 55 nm permits low noise and is suited to the high-density magnetic recording. The plate ratio (plate diameter/plate thickness) desirably ranges from 3 to 7, preferably from 3 to 5. Although low plate ratio is desirable because a filling property in the magnetic layer becomes high, it becomes difficult to achieve adequate orientation. When the plate ratio is equal to or less than 7, noise can be prevented due to stacking between particles.

The specific surface area by BET method within the above-mentioned particle size is 40 to 100 $m^2/g$, almost corresponding to an arithmetic value from the particle plate diameter and the plate thickness. Narrow distributions of particle plate diameter and thickness are normally good. Although difficult to render in number form, 500 particles can be randomly measured in a TEM photograph of particles to make a comparison. The distributions are often not a normal distribution. However, when expressed as the standard deviation to the average size, $\sigma$/average size=0.1 to 2.0. The particle producing reaction system is rendered as uniform as possible and the particles produced are subjected to a distribution-enhancing treatment to achieve a sharp particle size distribution. For example, methods such as selectively dissolving ultrafine particles in an acid solution by dissolution are known.

A hexagonal ferrite powder having a coercive force Hc ranging from 80 to 239 kA/m (1000 to 3000 Oe) can be manufactured. A high coercive force Hc is advantageous for high-density recording, but this is practically limited by the capacity of the recording head. The coercive force Hc of the hexagonal ferrite powder employed in the present invention is about 80 to 239 kA/m (1000 to 3000 Oe), preferably 143 to 207 kA/m (1800 to 2600 Oe). The coercive force Hc can be controlled by a particle size (plate diameter and plate thickness), types and quantities of elements contained, substituted sites of the elements, a particle producing reaction condition and the like. The saturation magnetization $\sigma s$ ranges from 40 to 70 A $m^2$/kg. Higher saturation magnetization $\sigma s$ is desirable. However, the saturation magnetization $\sigma s$ tends to decrease with decreasing particle size. Known methods of improving saturation magnetization $\sigma s$ are combining spinel ferrite with magnetoplumbite ferrite, selection of the type and quantity of elements incorporated, and the like. It is also possible to employ W-type hexagonal ferrite.

When kneading and dispersing hexagonal ferrite, the surface of the hexagonal ferrite powder particles is processed with a substance suited to a dispersion medium and a polymer. Both organic and inorganic compounds can be employed as surface treatment agents. Examples of the principal compounds are compounds of Si, Al, P, and the like; various silane coupling agents; and various titanium coupling agents. The quantity ranges from 0.1 to 10 percent relative to the hexagonal ferrite powder. The pH of the hexagonal ferrite powder is also important to dispersion. A pH of about 4 to 12 is usually optimum for the dispersion medium and polymer. From the perspective of the chemical stability and storage properties of the medium, a pH of about 6 to 11 can be selected. Moisture contained in the hexagonal ferrite powder also affects dispersion. There is an optimum level for the dispersion medium and polymer, usually selected from the range of 0.01 to 2.0 percent. Methods of manufacturing hexagonal ferrite include (1) the glass crystallization method in which a metal oxide substituted with barium oxide, iron oxide, and iron, and a glass-forming substance in the form of boron oxide or the like are mixed in proportions designed to yield a desired ferrite composition, melted, and quenched to obtain an amorphous product, subjected to a heat treatment again, washed, and pulverized to obtain barium ferrite crystal powder; (2) the hydrothermal reaction method in which a barium ferrite composition metal salt solution is neutralized with an alkali, the by-products are removed, the solution is liquid-phase heated at equal to or higher than 100° C., and the solution is washed, dried, and pulverized to obtain barium ferrite crystal powder; and (3) the coprecipitation method in which a barium ferrite composition metal salt solution is neutralized with an alkali, the by-products are removed, and the solution is dried, processed at equal to or less than 1,100° C., and pulverized to obtain barium ferrite crystal powder. However, any methods may be employed in the present invention.

Binder

Binders employed in the magnetic layer of the present invention are not limited so long as they are conventionally employed. All of thermoplastic resins, thermosetting resins, reactive resins, radiation curing resins and mixtures thereof can be employed.

The thermoplastic resins have a glass transition temperature of −100 to 150° C., have a number average molecular weight of 1,000 to 200,000, preferably 10,000 to 100,000, and have a degree of polymerization of about 50 to 1,000. Examples of such a thermoplastic resin are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in the *Handbook of Plastics* published by Asakura Shoten. It is also possible to employ known electron beam-cured resins in individual layers. Examples thereof and methods of manufacturing the same are described in detail in Japanese Unexamined Patent Publication (KOKAI) Showa No. 62-256219. The above-listed resins may be used singly or in combination. Preferred resins are combinations of polyurethane resin and at least one member selected from the group consisting of vinyl chloride resin, vinyl chloride-vinyl acetate copolymers, vinyl chloride-vinyl acetate-vinyl alcohol copolymers, and vinyl chloride-vinyl acetate-maleic anhydride copolymers, as well as combinations of the same with polyisocyanate.

Known polyurethane resin structures may be employed, such as polyester polyurethane, polyether polyurethane, polyether polyester polyurethane, polycarbonate polyurethane, polyester polycarbonate polyurethane, and polycaprolactone polyurethane. A binder obtained by incorporating as needed one or more polar groups selected from among —COOM, —$SO_3M$, —$OSO_3M$, —$P{=}O(OM)_2$, and —O—$P{=}O(OM)_2$ (where M denotes a hydrogen atom or an alkali metal base), —OH, —$NR_2$, —$N^+R_3$ (where R denotes a hydrocarbon group), epoxy group, —SH, and —CN into any of the above-listed binders by copolymerization or addition reaction to improve dispersion properties and durability is desirably employed. The quantity of such a polar group ranges from $10^{-1}$ to $10^{-8}$ mol/g, preferably from $10^{-2}$ to $10^{-6}$ mol/g.

Specific examples of the binders employed in the present invention are VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The quantity of binder added to the magnetic layer in the present invention ranges from 5 to 50 mass parts, preferably from 10 to 30 mass parts, relative to 100 mass parts of the hexagonal ferrite ferromagnetic powder. When employing vinyl chloride resin, the quantity of binder added is preferably from 5 to 30 mass parts; when employing polyurethane resin, from 2 to 20 mass parts; and when employing polyisocyanate, from 2 to 20 mass parts. They may be employed in combination. However, for example, when head corrosion occurs due to the release of trace amounts of chlorine, polyurethane alone or just polyurethane and isocyanate may be employed. When polyurethane is employed in the present invention, the glass transition temperature ranges from –50 to 150° C., preferably from 0 to 100° C.; the elongation at break desirably ranges from 100 to 2,000 percent; the stress at break desirably ranges from 0.49 to 98 MPa (0.05 to 10 kg/mm$^2$); and the yield point desirably ranges from 0.49 to 98 MPa (0.05 to 10 kg/mm$^2$).

The magnetic recording medium of the present invention comprises at least two layers of the nonmagnetic layer and the magnetic layer. Accordingly, the quantity of binder; the quantity of vinyl chloride resin, polyurethane resin, polyisocyanate, or some other resin in the binder; the molecular weight of each of the resins forming the magnetic layer; the quantity of polar groups; or the physical characteristics or the like of the above-described resins can naturally be different in the nonmagnetic layer and each of the magnetic layers as required. These should be optimized in each layer. Known techniques for a multilayered magnetic layer may be applied. For example, when the quantity of binder is different in each layer, increasing the quantity of binder in the magnetic layer effectively decreases scratching on the surface of the magnetic layer. To achieve good head touch, the quantity of binder in the nonmagnetic layer can be increased to impart flexibility.

Examples of polyisocyanates suitable for use in the present invention are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like.

These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co. Ltd.; and Desmodule L, Desmodule IL, Desmodule N and Desmodule HL manufactured by Sumitomo Bayer Co. Ltd. They can be used singly or in combinations of two or more in each of layers by exploiting differences in curing reactivity.

Abrasives

Abrasives can be contained in the magnetic layer for improving the mechanical strength of the magnetic layer as well as for preventing clogging of the magnetic head.

The abrasives employed in the present invention are preferably contained at least an abrasives with a Mohs' hardness equal to or higher than 6, preferably equal to or higher than 9, for example, α-alumina (Mohs' hardness: 9), chromium oxide (Mohs' hardness: 9), silicon carbide (Mohs' hardness: 9.5), silicon oxide (Mohs' hardness: 7), aluminum nitride (Mohs' hardness: 9), boron nitride (Mohs' hardness: 9.5). These normally have a nonconstant shape, prevent clogging of the magnetic head and improve a coating film strength. A composite comprising two or more of these abrasives (an abrasive obtained by surface-treating one abrasive with another) may also be used. Although these abrasives may contain compounds and elements other than the main component in some cases, there is no change in effect so long as the main component constitutes equal to or higher than 90 percent.

The average particle size of these abrasives ranges from 0.01 to 0.2 μm, preferably from 0.05 to 0.2 μm. When the average particle size is equal to or less than 0.2 μm, protrusions on the magnetic layer surface do not become large, and thus decreasing of electromagnetic characteristics, increasing of drop out, increasing of head abrasion amount and the like do not occur. Further, when the average particle size is equal to or higher than 0.01 μm, head clogging due to inadequate amount of protrusions does not occur. In particular, narrow particle size distribution is preferred for improving electromagnetic characteristics. As needed to improve durability, abrasives of differing particle size may be combined or the same effect may be achieved by broadening the particle diameter distribution even with a single abrasive. A tap density of 0.3 to 2 g/mL, a moisture content of 0.1 to 5 percent, a pH of 2 to 11, and a specific surface area of 1 to 30 m$^2$/g are desirable. The abrasive employed in the present invention may be any of acicular, spherical, or cubic in shape, but shapes that are partially angular have good abrasion properties and are thus preferred.

Specific examples of abrasives are: AKP-12, AKP-15, AKP-20, AKP-30, AKP-50, HIT-20, HIT-30, HIT-55, HIT-60A, HIT-70, HIT-80 and HIT-100 from Sumitomo Chemical Co., Ltd.; ERC-DBM, HP-DBM, and HPS-DBM from Reynolds Co.; WA10000 from Fujimi Abrasives Co.; UB20 from Kamimura Kogyo Co., Ltd.; G-5, Chromex U2, and Chromex U1 from Nippon Chemical Industrial Co., Ltd.; TF100 and TF-140 from Toda Kogyo Corp.; Beta Random Ultrafine from Ibidene Co.; and B-3 from Showa Mining Co., Ltd. As needed, these abrasives may be added to the nonmagnetic layer described below. Addition to the nonmagnetic layer permits control of surface shape and control of the manner in which the abrasive protrudes. It is, as a matter of course, preferred that the particle diameter and quantity of abrasive added to the magnetic layer and nonmagnetic layer are optimally established.

Other Additives

As necessary, various other additives can be added to the magnetic layer of the present invention, such as dispersing agents such as surfactants; lubricants such as higher fatty acids, fatty esters, and silicone oils; antistatic agents; and plasticizers.

In particular, in the present invention, the magnetic layer desirably comprises at least a fatty acid and fatty ester, with the fatty acid residues of the fatty acid and fatty esters being identical. Examples of fatty acids are monobasic fatty acids having 10 to 24 carbon atoms (optionally comprising unsaturated bonds and being branched). Examples of fatty esters are monofatty acids, difatty esters, or trifatty esters comprising a monobasic fatty acid having 10 to 24 carbon atoms (optionally comprising unsaturated bonds and being branched) and at least one from among a monohydric, dihydric, trihydric, tetrahydric, pentahydric, or hexahydric alcohol having 2 to 12 carbon atoms (optionally comprising an unsaturated bond and being branched); or a fatty ester of the monoalkylether of an alkylene oxide polymer. Examples of additives other than the fatty acids and fatty esters are molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; phenylphosphonic acid; α-naphthylphosphoric acid; phenylphosphoric acid; diphenylphosphoric acid; p-ethylbenzenephosphonic acid; phenylphosphinic acid; aminoquinones; various silane coupling agents and titanium coupling agents; fluorine-containing alkyl sulfuric acid esters and their alkali metal salts; metal salts (such as Li, Na, K, and Cu) of monobasic fatty acids (which may contain an unsaturated bond or be branched) having 10 to 24 carbon atoms; monohydric, dihydric, trihydric, tetrahydric, pentahydric or hexahydric alcohols with 12 to 22 carbon atoms (which may contain an unsaturated bond or be branched); alkoxy alcohols with 12 to 22 carbon atoms; fatty acid amides with 8 to 22 carbon atoms; and aliphatic amines with 8 to 22 carbon atoms.

Specific examples of these fatty acids are: capric acid, caprylic acid, lauric acid, myristic acid, palmitic acid, stearic acid, behenic acid, oleic acid, elaidic acid, linolic acid, linolenic acid, and isostearic acid. Examples of fatty acid esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, and ethylene glycol dioleyl. Examples of alcohols are oleyl alcohol, stearyl alcohol, and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho K. K.). These lubricants, antistatic agents and the like need not be 100 percent pure and may contain impurities, such as isomers, unreacted material, by-products, decomposition products, and oxides in addition to the main components. These impurities preferably comprise equal to or less than 30 percent, and more preferably equal to or less than 10 percent.

The above-mentioned lubricants and surfactants employed in the present invention each have different physical effects. The type, quantity, and combination ratio of lubricants producing synergistic effects should be optimally set for a given objective. It is conceivable to control bleeding onto the surface through the use of fatty acids having different melting points in the nonmagnetic layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant in the intermediate layer. The present invention is not limited to these examples. Generally, a total quantity of lubricant ranging from 0.1 to 50 mass parts, preferably from 2 to 25 mass parts with respect to 100 mass parts of the hexagonal ferrite ferromagnetic powder is desirably selected.

All or some of the additives used in the present invention may be added at any stage in the process of manufacturing the magnetic layer coating liquid. For example, they may be mixed with the magnetic material before a kneading step; added during a step of kneading the magnetic material, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits.

The magnetic layer coating liquid is prepared by adding an organic solvent to each component mentioned above. The organic solvent employed is not particularly limited and known organic solvents can be employed. It may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane.

These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention in the magnetic layer and in the nonmagnetic layer. However, the amount added may be varied. The stability of coating is increased by using a solvent with a high surface tension (such as cyclohexanone or dioxane) in the nonmagnetic layer. Specifically, it is important that the arithmetic mean value of the upper layer solvent composition be not less than the arithmetic mean value of the nonmagnetic layer solvent composition. To improve dispersion properties, a solvent having a somewhat strong polarity is desirable. It is desirable that solvents having a dielectric constant equal to or higher than 15 are comprised equal to or higher than 50 percent of the solvent composition. Further, the dissolution parameter is desirably 8 to 11.

Nonmagnetic Layer

In the magnetic recording medium of the present invention, the nonmagnetic layer desirably comprises at least carbon black and a binder comprised of a radiation-setting resin or thermosetting resin.

Carbon Black

Incorporating carbon black into the nonmagnetic layer helps retain lubricants and permits ready adjustment of the quantity of lubricant on the magnetic layer surface to within a desired range. In particular, when the magnetic layer is thin, equal to or less than 0.3 $\mu$m in thickness, carbon black in the nonmagnetic layer is important because it is difficult to incorporate an adequate quantity of lubricant in the magnetic layer alone. Further, the carbon black employed in the nonmagnetic layer effectively lowers the surface electrical resistivity of the magnetic layer and effectively prevents electrostatic damage to the MR head.

Examples of types of carbon black that are suitable for use in the nonmagnetic layer are furnace black for rubber, thermal for rubber, black for coloring and acetylene black. The following characteristics should be optimized by using different carbon blacks in combination to achieve desired effects.

The specific surface area of carbon black in the nonmagnetic layer ranges from 100 to 500 m$^2$/g, preferably from 150 to 400 m$^2$/g. The DBP oil absorption capacity ranges from 20 to 400 ml/100 g, preferably from 30 to 400 ml/100 g. The particle diameter of the carbon black ranges from 5 to 80 nm, preferably from 10 to 50 nm, more preferably from 10 to 40 nm. It is preferable for the carbon back to have a pH of 2 to 10, a moisture content of 0.1 to 10 percent and a tap density of 0.1 to 1 g/ml.

Specific examples of types of carbon black suitable for use in the present invention are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B, MA-600, MA-230, #4000 and #4010 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd. The carbon black employed can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 mass percent with respect to the inorganic powder above and does not exceed 40 percent with respect to the total mass of the nonmagnetic layer. These types of carbon black may be employed singly or in combination. The *Carbon Black Handbook* compiled by the Carbon Black Association may be consulted for types of carbon black suitable for use in the present invention.

Nonmagnetic Powder

Various inorganic powders can be employed in the nonmagnetic layer other than carbon black. Nonmagnetic powders suitable for use in the nonmagnetic layer can be selected from inorganic compounds such as metal oxides, metal carbonates, metal sulfates, metal nitrides, metal carbides, metal sulfides and the like. Examples of inorganic compounds are $\alpha$-alumina having an $\alpha$-conversion rate equal to or higher than 90 percent, $\beta$-alumina, $\gamma$-alumina, $\theta$-alumina, silicon carbide, chromium oxide, cerium oxide, $\alpha$-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable due to their narrow particle distribution and numerous means of imparting functions are titanium dioxide, zinc oxide, iron oxide and barium sulfate. Even more preferred are titanium dioxide and $\alpha$-iron oxide. Of these, the use of spherical ultramicrogranular iron oxide is preferred. The use of spherical ultramicrogranular iron oxide yields good dispersion properties, permitting the use of a high particle fill rate in the nonmagnetic layer. Further, the surface properties of the nonmagnetic layer itself improve, the surface properties of the magnetic layer improve, and electromagnetic characteristics can improve.

The particle size of the above-mentioned nonmagnetic powders preferably ranges from 0.005 to 2 $\mu$m, but nonmagnetic powders of differing particle size may be combined as needed, or the particle diameter distribution of a single nonmagnetic powder may be broadened to achieve the same effect. What is preferred most is a particle size in the nonmagnetic powder ranging from 0.01 to 0.2 $\mu$m. Particularly when the nonmagnetic powder is a granular metal oxide, a mean particle diameter equal to or less than 0.08 $\mu$m is preferred, and when an acicular metal oxide, the major axis length is preferably equal to or less than 0.3 $\mu$m, more preferably equal to or less than 0.2 $\mu$m. The tap density ranges from 0.05 to 2 g/ml, preferably from 0.2 to 1.5 g/ml. The moisture content of the nonmagnetic powder ranges from 0.1 to 5 mass percent, preferably from 0.2 to 3 mass percent, further preferably from 0.3 to 1.5 mass percent. The pH of the nonmagnetic powder ranges from 2 to 11, and the pH between 5.5 to 10 is particular preferred. The specific surface area of the nonmagnetic powder ranges from 1 to 100 m$^2$/g, preferably from 5 to 80 m$^2$/g, further preferably from 10 to 70 m$^2$/g. The crystallite size of the nonmagnetic powder preferably ranges from 0.004 to 1 $\mu$m, further preferably from 0.04 to 0.1 $\mu$m. The oil absorption capacity using dibutyl phthalate (DBP) ranges from 5 to 100 ml/100 g, preferably from 10 to 80 ml/g, further preferably from 20 to 60 ml/100 g. The specific gravity ranges from 1 to 12, preferably from 3 to 6. The shape may be any of acicular, spherical, polyhedral, or plate-shaped. The Mohs' hardness is preferably 4 to 10. The stearic acid (SA) adsorption capacity of the nonmagnetic powders ranges from 1 to 20 $\mu mol/m^2$, preferably from 2 to 15 $\mu mol/m^2$, further preferably from 3 to 8 $\mu mol/m^2$. The pH between 3 to 6 is preferred. The surface of these nonmagnetic powders is preferably treated with $Al_2O_3$, $SiO_2$, $TiO_2$, $ZrO_2$, $SnO_2$, $Sb_2O_3$, ZnO and $Y_2O_3$. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders suitable for use in the nonmagnetic layer of the magnetic recording medium of the present invention are: Nanotite from Showa Denko K. K.; HIT-100 and ZA-GL from Sumitomo Chemical Co., Ltd.; α-hematite DPN-250, DPN-250BX, DPN-245, DPN-270BX, DPN-500BX, DBN-SA1 and DBN-SA3 from Toda Kogyo Corp.; titanium oxide TTO-51B, TTO-55A, TTO-55B, TTO-55C, TTO-55S, TTO-55D, SN-100, α-hematite E270, E271, E300 and E303 from Ishihara Sangyo Co., Ltd.; titanium oxide STT-4D, STT-30D, STT-30, STT-65C, and α-hematite α-40 from Titan Kogyo K. K.; MT-100S, MT-100T, MT-150W, MT-500B, MT-600B, MT-100F, and MT-500HD from Tayca Corporation; FINEX-25, BF-1, BF-10, BF-20, and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; and sintered products of the same. Particular preferable nonmagnetic powders are titanium dioxide and α-iron oxide.

Binder

Binders suitable for use in the nonmagnetic layer are comprised of radiation-setting resins or thermosetting resins, with radiation-setting resins being preferred.

In the present specification, the term "radiation-setting resin" refers to a resin generating radicals when exposed to radiation, curing by crosslinking or polymerization, and comprising one or more unsaturated double bond in the molecular chain.

With thermosetting resins conventionally employed, a primary roll on which a nonmagnetic layer is already coated desirably placed in an oven for an extended period (for example, 2 to 48 hours at 70° C.) and cured. However, such a manufacturing step requires time, and there are problems in the form of deformation of the coated film due to winding and decreased smoothness of the magnetic layer surface. Accordingly, to eliminate such drawbacks, a radiation-setting resin is employed as binder in the nonmagnetic layer; a nonmagnetic layer coating material is coated, dried, and processed for smoothness; radiation is applied; and three-dimensional crosslinking is induced. Subsequently, a magnetic layer coating material is coated on the nonmagnetic layer to achieve suitable results.

Based on this method, since the nonmagnetic layer has already undergone three-dimensional crosslinking when the magnetic layer is applied, it is desirable to prevent swelling caused by organic solvents.

Examples of radiation-setting resins suitable for use in the nonmagnetic layer are vinyl chloride-based resins, polyurethane resin, polyester resin, epoxy-based resin, phenoxy resins, fiber-based resins, polyether-based resins, and polyvinyl alcohol-based resins. Of these, vinyl chloride-based resins and polyurethane resins are representative, and the admixture of these two is preferably used.

The content of radiation-setting resin in the nonmagnetic layer is preferably 10 to 100 mass parts, and more preferably, 12.5 to 70 weight parts, per 100 mass parts of total carbon black and inorganic powder combined. When the content of radiation-setting resin falls within the above-stated range, adequate coated film strength is achieved, poor dispersion does not occur during preparation of nonmagnetic layer coating material, and a smooth nonmagnetic layer surface can be formed.

The radiation used on the radiation-setting resin can be an electron beam, γ radiation, β radiation, ultraviolet radiation, or the like, with an electron beam being preferred. A radiation level of 1 to 10 Mrad is good, with 3 to 7 Mrad being preferred. The exposure energy (acceleration voltage) is desirably equal to or greater than 100 kv. Exposure to radiation is desirably conducted after coating and drying but before winding; however, exposure can be conducted after winding.

The resins employed in the magnetic layer may be employed as the thermosetting resin in the nonmagnetic layer. Further, as necessary, the various additives described for the magnetic layer, such as lubricants, dispersing agents, antistatic agents, and plasticizers, are desirably incorporated into the nonmagnetic layer.

Backcoat Layer

In the magnetic recording medium of the present invention, a backcoat layer may be provided on the opposite side of the nonmagnetic support from the nonmagnetic layer and the magnetic layer to achieve effects such as running stability, prevention of static, and to compensate for curling. The backcoat layer desirably comprises 30 to 80 mass percent of carbon black. When the content of carbon black falls within the range of 30 to 80 mass percent, good antistatic effects and running stability are achieved and good running durability is achieved without a decrease in the backcoat layer strength.

The carbon black that is commonly employed in magnetic recording tape may be widely employed in the backcoat layer. Examples are furnace black for rubber, thermal for rubber, black for coloring and acetylene black. To prevent irregularities in the backcoat layer from being transferred to the magnetic layer, the particle diameter of the carbon black is desirably equal to or less than 0.3 $\mu m$, particularly preferably 0.01 to 0.1 $\mu m$. Further, the quantity of carbon black employed in the backcoat layer is desirably set to the extent that an optical transmission density (the transmission level of the TR-927 made by Macbeth Co.) is equal to or less than 2.0.

The use of two types of carbon black of differing average particle size is advantageous to improving running durability. In that case, the combined use of a first carbon black with an average particle size ranging from 0.01 to 0.04 $\mu m$ and a second carbon black with an average particle size ranging from 0.05 to 0.3 $\mu m$ is desirable. The content of the second type of carbon black is suitably 0.1 to 10 mass parts, preferably 0.3 to 3 mass parts, per 100 mass parts of the total quantity of granular oxides and the first type of carbon black.

The content of the binder employed in the backcoat layer is preferably 15 to 200 mass parts, more preferably 50 to 180 mass parts, per 100 mass parts of the total solid component. When the content of binder falls within the above-stated range, friction with the medium slide path is inhibited, resulting in improved running stability. As a result, running failures do not occur and the problem of blocking with the magnetic layer does not occur. Further, suitable strength can be achieved in the backcoat layer and good running durability can be achieved.

In addition to the above-described carbon black, the various abrasives and other nonmagnetic inorganic powders described for the magnetic layer may be incorporated into the backcoat layer to increase mechanical strength. The content of nonmagnetic inorganic powder is preferably 0.1 to 5 mass parts, more preferably 0.5 to 2 mass parts, per 100 mass parts of carbon black. The average particle diameter of the nonmagnetic inorganic powder is preferably 0.1 to 0.5 μm.

In addition, the surfactants and other dispersing agents, higher fatty acids, fatty esters, lubricants, and various other additives described for the magnetic layer may be added as needed to the backcoat layer.

Nonmagnetic Support

The material employed as the nonmagnetic support in the magnetic recording medium of the present invention is not specifically limited. Based on the objective, a selection may be made from among various flexible materials and various rigid materials. These may be fashioned into the prescribed shapes such as tape shape, and dimensions according to various standards.

Examples of flexible materials include polyesters such as polyethylene terephthalate and polyethylene naphthalate, polyolefins such as polypropylene, and various resins such as cellulose triacetate, polyamides, polyimides, polyamidoimides, polysulfones, polyaramides, polycarbonate, polyaramide, aromatic polyamides, and polybenzooxazoles. To change the surface roughness of the magnetic surface and base surface, a laminated support such as those described in Japanese Unexamined Patent Publication (KOKAI) Heisei No. 3-224127 may be employed as required. These nonmagnetic supports may be subjected beforehand to corona discharge treatment, plasma treatment, adhesion-enhancing treatment, heat treatment, dust removal, or the like.

The surface roughness shape of the nonmagnetic support may be freely controlled through the size and quantity of filler added to the support as needed. Examples of such fillers are oxides and carbonates of Ca, Si, Ti, Al and the like, and organic resin micropowders such as acrylic-based one. A combination of $Al_2O_3$ and the organic resin micropowder is preferred.

The surface roughness of the nonmagnetic support is equal to or less than 20 nm, preferably equal to or less than 15 nm, as a center surface average surface roughness Ra.

The F-5 value of the nonmagnetic support desirably ranges from 49 to 490 MPa (5 to 50 kg/mm$^2$). The thermal shrinkage rate of the support after 30 min at 100° C. is preferably equal to or less than 3 percent, more preferably equal to or less than 1.5 percent. The thermal shrinkage rate after 30 min at 80° C. is preferably equal to or less than 1 percent, more preferably equal to or less than 0.5 percent. It is preferable that the breaking strength ranges from 49 to 980 MPa (5 to 100 kg/mm$^2$) and the modulus of elasticity ranges from 0.98 to 19.6 GPa (100 to 2,000 kg/mm$^2$). The thermal expansion coefficient ranges from $10^{-4}$ to $10^{-8}$/° C., preferably from $10^{-5}$ to $10^{-6}$/° C. The moisture expansion coefficient is equal to or less than $10^{-4}$/RH percent, preferably equal to or less than $10^{-5}$/RH percent. These thermal characteristics, dimensional characteristics, and mechanical strength characteristics are desirably nearly equal, with a difference equal to less than 10 percent, in all in-plane directions.

Layer Structure

The thickness of the magnetic layer in the present invention is preferably equal to or less than 0.30 μm, more preferably ranging from 0.05 to 0.30 μm, and still more preferably ranging from 0.10 to 0.25 μm. When the magnetic layer is equal to or less than 0.3 μm, self magnetization loss and thickness loss can be reduced.

Further, the magnetic layer may be divided into two or more layers having different magnetic characteristics; known multilayered magnetic layer configurations may be employed.

The thickness of the nonmagnetic layer in the present invention normally ranges from 0.1 to 2.5 μm, preferably from 0.3 to 2.3 μm. When the thickness of the nonmagnetic layer falls within the range of 0.1 to 2.5 μm, the effect of the surface properties of the nonmagnetic support can be suppressed and the surface of the nonmagnetic layer can be rendered smooth. Further, since the surface stage of the nonmagnetic layer is good, the surface of the magnetic layer can also be rendered smooth and electromagnetic characteristics can be improved.

The thickness of the backcoat layer (after calendering) is equal to or less than 1.0 μm, preferably ranging from 0.1 to 1.0 μm, and more preferably ranging from 0.2 to 0.8 μm. When the thickness of the backcoat layer falls within the stated range, the surface properties of the backcoat layer do not deteriorate due to the effect of the surface properties of the nonmagnetic support. Further, the roughness of the backcoat layer surface is not transferred to the surface of the magnetic layer in the course of heat curing, not causing reproduction output to drop. In addition, the backcoat layer shavings are not produced during running of the medium. Since friction with the medium slide paths can be reduced, good running stability can be achieved.

The thickness of the nonmagnetic support preferably ranges from 3.0 to 20.0 μm.

An undercoating layer for improving adhesion between the nonmagnetic support and the nonmagnetic layer or magnetic layer may be provided in the magnetic recording medium of the present invention. The thickness of the undercoating layer ranges from 0.01 to 0.5 μm, preferably from 0.02 to 0.5 μm. The magnetic recording medium of the present invention may be a disk-shaped medium with double-sided magnetic layers in which a nonmagnetic layer and magnetic layer are provided on both sides of the nonmagnetic support, or may have these layers on just one side.

Manufacturing Method

The magnetic recording medium of the present invention can be manufactured by the method in which the coating materials for the nonmagnetic layer and the magnetic layer are respectively prepared using the above materials and coated on the nonmagnetic support in this manner.

Each of the coating materials for the nonmagnetic layer and the magnetic layer is prepared by performing at least a kneading step, a dispersing step, and a mixing step, viscosity adjustment step and filtering step to be carried out, if necessary, before and/or after the kneading and dispersing steps. Each of the individual steps may be divided into two or more stages.

For kneading and dispersing the above-mentioned coating materials, conventionally known manufacturing techniques may be utilized for some or all of the steps. A kneader having a strong kneading force, such as a continuous kneader and pressure kneader is preferably employed in the kneading step. When the continuous kneader or the pressure kneader is employed, the hexagonal ferrite ferromagnetic powder or nonmagnetic inorganic powder and all or part of the binder are kneaded. A slurry temperature during kneading preferably ranges from 50 to 100° C.

A dispersing medium with a high specific gravity is desirably employed for dispersing the coating material.

Ceramic media such as zirconia and titania is suitable for use. Glass beads, metal beads, alumina beads and the like which are conventionally employed can be selected for use depending on the mixing composition.

When manufacturing the magnetic recording medium, backcoat layer can be coated before or after coating the nonmagnetic layer and the magnetic layer, or can be coated simultaneously.

Examples of coating means suitable for use are gravure coating, reverse coating, and extrusion nozzle; the use of a die nozzle coater is preferred.

After applying the magnetic layer, a magnetic field is desirably applied to orient the magnetic particles in the layer. Depending on the objective, the direction of orientation may be parallel, perpendicular, or at an angle to the running direction of the medium. To impart a prescribed orientation, a permanent magnet such as a ferrite magnet or rare earth magnet, or an electromagnet, solenoid, or the like is used to apply a magnetic field equal to or greater than 100 T·m (1,000 G), it being desirable to employ more than one of these magnetic field generating means in combination. Further, a suitable preliminary drying step may be employed prior to orientation, or drying may be conducted simultaneously with orientation to ensure the maximum degree of orientation after drying.

After applying the magnetic layer in this manner, the oriented coating is normally dried and fixed by hot air, far infrared radiation, an electric heater, a vacuum device, or some other known drying and evaporation means provided in a drying oven. The drying temperature ranges from room temperature to about 300° C. and may be suitably selected based on the heat resistance of the nonmagnetic support, type of solvent, concentration, and the like. It is also possible to impart a temperature gradient within the drying oven. The gas atmosphere employed within the drying oven may be common air or an inert gas.

Following drying of the magnetic layer, calendering may be conducted as a surface smoothening process as needed. The rolls employed in calendering may be a combination of plastic rolls having heat resistance, such as epoxy, polyester, nylon, polyimide, polyamide, and polyimidoamide, and metal rolls (a three to seven-stage combination). Processing may also be conducted with metal rolls. The processing temperature is desirably equal to or greater than 80° C., more preferably equal to or greater than 85° C. The linear pressure is desirably equal to or greater than 200 kg/cm, more preferably equal to or greater than 250 kg/cm. The processing speed ranges from 20 to 900 m/min.

Embodiment

The present invention will be described more specifically by the following embodiments; however, the present invention should not be limited thereto. Unless specifically stated otherwise, "parts" refers to "mass parts" in the embodiments.

Manufacture of Coating Material
Coating Material for Magnetic Layer (Hexagonal Ferrite)

| | |
|---|---|
| Barium ferrite magnetic powder | 100 parts |
| Surface treatment: 5 mass percent of $Al_2O_3$, 2 mass percent of $SiO_2$ | |
| Coercive force Hc: 199 kA/m (2500 Oe) | |
| Plate diameter: 0.03 μm | |
| Plate ratio: 3 | |
| Saturation magnetization σs: 56 A·$m^2$/kg (emu/g) | |
| Vinyl chloride copolymer | 6 parts |
| MR555 (manufactured by Nippon Zeon Co., Ltd.) | |
| Polyurethane resin | 3 parts |
| UR8200 (manufactured by Toyobo Co., Ltd.) | |
| α-alumina (particle size: 0.3 μm) | 2 parts |
| HIT55 (manufactured by Sumitomo Chemical Co., Ltd.) | |
| Carbon black (particle size: 0.015 μm) | 5 parts |
| #55 (manufactured by Asahi Carbon Co., Ltd.) | |
| Butyl stearate | 1 part |
| Stearic acid | 2 parts |
| Methyl ethyl ketone | 125 parts |
| Cyclohexaonone | 125 parts |

Coating Material for Nonmagnetic Layer 1 (Thermosetting Resin)

| | |
|---|---|
| Nonmagnetic powder acicular α-$Fe_2O_3$ | 75 parts |
| (DPN-250BX manufactured by Toda Kogyo Co., Ltd., major axis length = 0.15 μm, specific surface area = 53 $m^2$/g) | |
| Carbon black | 20 parts |
| CONDUCTEX SC-U (manufactured by Columbia Carbon Co., Ltd.) | |
| Vinyl chloride copolymer | 12 parts |
| MR110 (manufactured by Nippon Zeon Co., Ltd.) | |
| Polyurethane resin | 5 parts |
| UR8200 (manufactured by Toyobo Co., Ltd.) | |
| Phenylphosphorous acid | 4 parts |
| Butyl stearate | 1 part |
| Stearic acid | 3 parts |
| Methyl ethyl ketone/cyclohexanone (mixing solvent at 8/2) | 250 parts |

Coating Material for Nonmagnetic Layer 2 (EB Curing)

| | |
|---|---|
| Acicular α-$Fe_2O_3$ (DPN-250BX manufactured by Toda Kogyo Corp.) | 75 parts |
| Major axis length = 0.15 μm | |
| Specific surface area $S_{BET}$ = 53 $m^2$/g | |
| Carbon black | 25 parts |
| (Raven760B manufactured by Columbia Carbon Co., Ltd.) | |
| Average particle diameter = 30 nm | |
| Specific surface area = 70 $m^2$/g | |
| DBP oil absorption capacity = 48 ml/100 g | |
| Electron beam curing type vinyl chloride resin | 10 parts |
| (Vinyl chloride-epoxy containing monomer copolymer, average degree of polymerization = 310, epoxy content = 3 wt %, S content = 0.6 wt %, acryl content = 6/1 molecule, Tg = 60° C.) | |
| Electron beam curing type polyester polyurethane resin | 7 parts |
| (Phosphorus compound-hydroxy containing polyester polyurethane, number average molecular weight = 13000, acryl content = 6/1 molecule, Tg = 10° C.) | |
| Butyl stearate | 1 part |
| Stearic acid | 3 parts |
| Methyl ethyl ketone/cyclohexanone (mixing solvent at 8/2) | 250 parts |

Preparation of Coating Material for Backcoat Layer
Dispersion

The following composition was added to a ball mill and dispersed for 24 hours.

| | |
|---|---|
| Carbon black 1 | 80 parts |
| (Conductex SC manufactured by Columbia Carbon Co., Ltd., average particle diameter = 20 nm, specific surface area $S_{BET}$ = 220 $m^2$/g) | |
| Carbon black 2 | 5 parts |
| (Sevacarb MT manufactured by Columbia Carbon Co., Ltd., average particle diameter = 350 nm, specific surface area $S_{BET}$ = 8 $m^2$/g) | |

-continued

| | |
|---|---|
| α-Fe₂O₃ | 1 part |
| (TF100 manufactured by Toda Kogyo Corp., average particle diameter = 0.1 μm) | |
| Nitrocellulose resin | 65 parts |
| Polyester polyurethane resin | 35 parts |
| (UR-8300 manufactured by Toyobo Co., Ltd.) | |
| MEK | 260 parts |
| Toluene | 260 parts |
| Cyclohexanone | 260 parts |

The following composition was mixed with a slurry dispersed and stirred, followed by dispersing again in a ball mill for 3 hours.

| | |
|---|---|
| Stearic acid | 1 part |
| Butyl stearate | 2 parts |
| MEK | 210 parts |
| Toluene | 210 parts |
| Cyclohexanone | 210 parts |

One part of an isocyanate compound (Coronate L manufactured by Nippon Polyurethane Co., Ltd.) was added to 100 parts of the coating material filtered, and then mixed and stirred to prepare a backcoat coating material.

Embodiment 1

Each component of the above-mentioned magnetic layer coating material and nonmagnetic layer coating material 1 was kneaded in a kneader and dispersed using a sand mill for 12 hours. Polyisocyanate was added to the dispersions obtained: 2.5 parts to the nonmagnetic coating material and 3 parts to the magnetic layer coating liquid. To each, 40 parts of cyclohexanone were then added and the mixtures were filtered with a filter having an average pore size of 1 μm to prepare nonmagnetic and magnetic coating materials. Simultaneous multilayer coating was conducted on an aramide support (trade name: Mictron) 4.4 μm in thickness and having a center surface average surface roughness of 2 nm by applying the nonmagnetic coating material in a quantity designed to yield a dry thickness of 1.7 μm and then applying immediately thereover the magnetic layer coating material in a quantity designed to yield a magnetic layer thickness of 0.15 μm. While both layers were still wet, the two layers were oriented with a cobalt magnet having a magnetic force of 600 T·m (6,000 G) and a solenoid having a magnetic force of 600 T·m (6,000 G). After drying, processing was conducted with a seven-stage calender comprised only of metal rolls at a temperature of 85° C. and a rate of 200 m/min. Subsequently, a backcoat layer 0.6 μm in thickness was applied. After annealing the coated roll (70° C., 48 hours), it was slitted to a width of ½ inch and the surface of the magnetic layer was cleaned with a tape cleaning device by mounting it on a device equipped with slitted product feeding and winding devices so that a nonwoven fabric and razor blade contacted with a magnetic surface.

Embodiment 2

With the exception that the backcoat layer thickness was set to 0.3 μm, tape samples were prepared under the same conditions as in Embodiment 1.

Embodiment 3

The magnetic coating material was kneaded in a kneader and dispersed for 12 hours in a sand mill. Three parts of polyisocyanate were added to the dispersion obtained, followed by adding 40 parts of cyclohexanone. The mixture was then filtered with a filter having a average pore size of 1 μm to prepare a magnetic layer coating liquid.

After kneading the nonmagnetic layer coating liquid 2 in a kneader, it was dispersed for 12 hours in a sand mill. The nonmagnetic coating liquid was then coated in a quantity designed to yield a dry nonmagnetic layer 1.7 μm in thickness on an aramide support (trade name: Mictron) 4.4 μm thick having a center surface average surface roughness of 2 nm. Following drying, the product was processed with a seven-stage calender comprised of only metal rolls at a temperature of 85° C. and a rate of 200 m/min. Subsequently, the product was cured by exposure to an electron beam in a nitrogen gas atmosphere. The magnetic layer coating material was applied over this nonmagnetic layer and oriented with a cobalt magnet having a magnetic force of 600 T·m (6,000 G) and a solenoid having a magnetic force of 600 T·m (6,000 G). After drying, processing was conducted with a seven-stage calender comprised only of metal rolls at a temperature of 85° C. and a rate of 200 m/min. Subsequently, a backcoat layer 0.6 μm in thickness was coated. After annealing the coated roll (70° C., 48 hours), it was slitted to a width of ½ inch and the surface of the magnetic layer was cleaned with a tape cleaning device by mounting it on a device equipped with slitted product feeding and winding devices so that a nonwoven fabric and razor blade contacted with a magnetic surface.

Embodiment 4

Medium was prepared in the same manner as in Embodiment 3 with the exceptions that 15 mass parts of carbon black 2 (Sevacarb MT made by Colombia Carbon Co., Ltd.) were employed in the backcoat layer coating liquid and no annealing was conducted following the calendering in Embodiment 3.

COMPARATIVE EXAMPLE 1

Tape sample was prepared under the same conditions as in Embodiment 1 with the exception that 15 mass parts of carbon black 2 (Sevacarb MT made by Colombia Carbon Co., Ltd.) were employed in the backcoat layer coating liquid.

COMPARATIVE EXAMPLE 2

Tape sample was prepared in the same manner as in Embodiment 3 with the exception that the magnetic coating material was dispersed for 3 hours.

COMPARATIVE EXAMPLE 3

Tape sample was prepared under the same conditions as in Embodiment 1 with the exceptions that the magnetic coating material was dispersed for 3 hours and 15 mass parts of carbon black 2 (Sevacarb MT made by Colombia Carbon Co., Ltd.) were employed in the backcoat layer coating liquid.

Method of Measuring Pits in the Magnetic Layer Surface by AFM

Three-dimensional surface roughness was measured with a Nanoscope III made by Digital Instruments in U.S.A. and the number of pits having a depth of 50 nm or more from the average plane of magnetic layer surface roughness was measured. The measurements were conducted over a 100 μm×100 μm (10,000 μm²) range. The center surface average roughness SRa was measured as the center surface average roughness within the above measurement range.

SNR Measurement

Measurement of the S/N was conducted with a tape feeding device equipped with a linear head-type guide assembly on which a commercial MR head was mounted. A signal was written at a recording wavelength of 0.3 μm at a tape conveyance rate of 3 m/sec and a write track width of 27 µm. This was reproduced with an MR head having a track width of 12.5 µm. The output obtained with a spectrum analyzer and the noise level in the 0 to 12 MHz bandwidth were measured and the S/N ratio was obtained. An SNR equal to or greater than 25 dB was considered good.

TABLE 1

| Sample | Number of pits having a depth of 50 nm or more (/10000 µm²) | SRa (nm) | SNR |
|---|---|---|---|
| Embodiment 1 | 47 | 4.5 | 29.5 |
| Embodiment 2 | 95 | 5.9 | 26.5 |
| Embodiment 3 | 5 | 3.8 | 32.9 |
| Embodiment 4 | 68 | 5.5 | 31 |
| Comparative Example 1 | 113 | 5.7 | 24.7 |
| Comparative Example 2 | 90 | 6.5 | 23.9 |
| Comparative Example 3 | 178 | 7.1 | 21.6 |

Table 1 shows that the magnetic tape samples of Embodiments 1 through 4 in which the number of pits having a depth of 50 nm or more and the center surface average roughness on the magnetic layer falling within the ranges of the present invention all had good SNRs. By contrast, Comparative Examples 1 and 3 had high noise levels because the number of pits exceeded 100. Although Comparative Example 2 had a number of pits equal to or less than 100, since the center surface average roughness SRa exceeded 6 nm, reproduction output dropped and the targeted SNR was not achieved.

Manufacture of Coating Material
Magnetic Coating Material (Hexagonal Ferrite)

| | |
|---|---|
| Barium ferrite magnetic powder | 100 parts |
| Surface treatment: 5 mass percent of $Al_2O_3$, 2 mass percent of $SiO_2$ | |
| Coercive force Hc: 199 kA/m (2500 Oe) | |
| Plate diameter: 0.03 µm | |
| Plate ratio: 3 | |
| Saturation magnetization σs: 56 A · m²/kg (56 emu/g) | |
| Polyurethane resin | 18 parts |
| UR5500 (manufactured by Toyobo Co., Ltd.) | |
| α-alumina (particle size: 0.3 µm) | 2 parts |
| HIT55 (manufactured by Sumitomo Chemical Co., Ltd.) | |
| Carbon black (particle size: 0.015 µm) | 5 parts |
| #55 (manufactured by Asahi Carbon Co., Ltd.) | |
| Butyl stearate | 1 part |
| Stearic acid | 2 parts |
| Methyl ethyl ketone | 125 parts |
| Cyclohexaonone | 125 parts |

Nonmagnetic Coating Material 3 (for Nonmagnetic Layer: Thermosetting Resin)

| | |
|---|---|
| Nonmagnetic powder acicular α-$Fe_2O_3$ | 75 parts |
| (DPN-250BX manufactured by Toda Kogyo Co., Ltd.) | |
| Major axis length: 0.15 µm | |
| Specific surface area: 53 m²/g | |
| Carbon black | 20 parts |
| CONDUCTEX SC-U | |
| (manufactured by Columbia Carbon Co., Ltd.) | |
| Vinyl chloride copolymer | 12 parts |
| MR110 (manufactured by Nippon Zeon Co., Ltd.) | |
| Polyurethane resin | 5 parts |
| UR8200 (manufactured by Toyobo Co., Ltd.) | |
| Phenylphosphorous acid | 4 parts |
| Butyl stearate | 1 part |
| Stearic acid | 3 parts |
| Methyl ethyl ketone/cyclohexanone (mixing solvent at 8/2) | 250 parts |

Nonmagnetic Coating Material 4 (for Nonmagnetic Layer: EB Curing)

| | |
|---|---|
| Acicular α-$Fe_2O_3$ | 75 parts |
| (DPN-250BX manufactured by Toda Kogyo Corp.) | |
| Major axis length: 0.15 µm | |
| Specific surface area: 53 m²/g | |
| Carbon black | 25 parts |
| (Raven760B manufactured by Columbia Carbon Co., Ltd.) | |
| Average particle diameter: 30 nm | |
| Specific surface area: 70 m²/g | |
| DBP oil absorption capacity: 48 ml/100 g | |
| Electron beam curing type vinyl chloride resin | 10 parts |
| Vinyl chloride-epoxy containing monomer copolymer | |
| Average degree of polymerization: 310 | |
| Epoxy content: 3 wt % | |
| S content = 0.6 wt % | |
| Acryl content: 6/1 molecule | |
| Tg: 60° C. | |
| Electron beam curing type polyester polyurethane resin | 7 parts |
| Phosphorus compound-hydroxy containing polyester polyurethane | |
| Number average molecular weight: 13000 | |
| Acryl content: 6/1 molecule | |
| Tg: 10° C. | |
| Butyl stearate | 1 part |
| Stearic acid | 3 parts |
| Methyl ethyl ketone/cyclohexanone (mixing solvent at 8/2) | 250 parts |

Preparation of Coating Material for Backcoat Layer Dispersion

The following composition was added to a ball mill and dispersed for 24 hours.

| | |
|---|---|
| Carbon black 1 | 80 parts |
| Conductex SC manufactured by Columbia Carbon Co., Ltd. | |
| Average particle diameter: 20 nm | |
| BET specific surface area: 220 m²/g | |
| Carbon black 2 | 5 parts |
| Sevacarb MT manufactured by Columbia Carbon Co., Ltd. | |
| Average particle diameter: 350 nm | |
| BET specific surface area: 8 m²/g | |
| α-$Fe_2O_3$ | 1 part |
| TF100 manufactured by Toda Kogyo Corp. | |
| Average particle diameter: 0.1 µm | |
| Nitrocellulose resin | 65 parts |
| Polyester polyurethane resin | 35 parts |
| (UR-8300 manufactured by Toyobo Co., Ltd.) | |
| MEK | 260 parts |
| Toluene | 260 parts |
| Cyclohexanone | 260 parts |

The following composition was mixed with a slurry dispersed and stirred, following by dispersing again in a ball mill for 3 hours.

| | |
|---|---|
| Stearic acid | 1 part |
| Butyl stearate | 2 parts |
| MEK | 210 parts |
| Toluene | 210 parts |
| Cyclohexanone | 210 parts |

One mass part of an isocyanate compound (Coronate L manufactured by Nippon Polyurethane Co., Ltd.) was added to 100 mass parts of the coating material filtered, and then mixed and stirred to prepare a backcoat coating material.

Sample 1

Each component of the above-mentioned magnetic coating material and nonmagnetic coating material 3 was kneaded in a kneader and dispersed using a sand mill for 12 hours. Polyisocyanate was added to the dispersions obtained: 2.5 parts to the nonmagnetic layer coating liquid and 3 parts to the magnetic layer coating liquid. To each, 40 parts of cyclohexanone were then added, and the mixtures were filtered with a filter having an average pore size of 1 $\mu$m to prepare nonmagnetic layer and magnetic layer coating liquids. Simultaneous multilayer coating was conducted on an aramide support (trade name: Mictron) 4.4 $\mu$m in thickness and having a center surface average surface roughness of 2 nm by applying the nonmagnetic layer coating liquid in a quantity designed to yield a dry thickness of 1.7 $\mu$m and then applying immediately thereover the magnetic layer coating liquid in a quantity designed to yield a magnetic layer thickness of 0.15 $\mu$m. While both layers were still wet, the two layers were oriented with a cobalt magnet having a magnetic force of 600 T·m (6,000 G) and a solenoid having a magnetic force of 600 T·m (6,000 G). After drying, processing was conducted with a seven-stage calender comprised only of metal rolls at a temperature of 85° C. and a rate of 200 m/min. Subsequently, a backcoat layer 0.6 $\mu$m in thickness was coated. After annealing the coated roll (70° C., 48 hours), it was slitted to a width of ½ inch and the surface of the magnetic layer was cleaned with a tape cleaning device by mounting it on a device equipped with slitted product feeding and winding devices so that a nonwoven fabric and razor blade contacted with a magnetic surface..

Sample 2

Tape sample was prepared under the same conditions as in Sample 1 with the exception that the thickness of the backcoat layer was made 0.3 $\mu$m.

Sample 3

The magnetic coating material was kneaded in a kneader and dispersed in a sand mill for 12 hours. Three parts of polyisocyanate were added to the dispersion obtained, followed by adding 40 parts of cyclohexanone, and the mixture was filtered with a filter having an average pore size of 1 $\mu$m to prepare a magnetic layer coating liquid.

Nonmagnetic coating material 4 was kneaded in a kneader and dispersed for 12 hours in a sand mill. The nonmagnetic coating material was then applied in a quantity designed to yield a nonmagnetic layer 1.7 $\mu$m in thickness upon drying on an aramide support (trade name: Mictron) 4.4 $\mu$m in thickness and having a center surface average surface roughness of 2 nm. Processing was conducted with a seven-stage calender comprising only metal rolls at a temperature of 85° C. and a speed of 200 m/min. Subsequently, the product was cured by exposure to an electron beam in a nitrogen gas atmosphere. Over the lower nonmagnetic layer, applied was an upper magnetic layer coating material, which was then oriented with a cobalt magnet having a magnetic force of 600 T·m (6,000 G) and a solenoid having a magnetic force of 600 T·m (6,000 G). After drying, processing was conducted with a seven-stage calender comprised only of metal rolls at a temperature of 85° C. and a rate of 200 m/min. Subsequently, a backcoat layer 0.6 $\mu$m in thickness was coated. After annealing the coated roll (70° C., 48 hours), it was slitted to a width of ½ inch and the surface of the magnetic layer was cleaned with a tape cleaning device by mounting it on a device equipped with slitted product feeding and winding devices so that a nonwoven fabric and razor blade contacted with a magnetic surface.

Sample 4

Medium was prepared in the same manner as in Sample 3 with the exceptions that 15 mass parts of carbon black 2 (Sevacarb MT made by Colombia Carbon Co., Ltd.) were employed in the backcoat coating liquid and no annealing was conducted following calendering.

Sample 5

Tape sample was prepared under the same conditions as in Sample 1 with the exception that 15 mass parts of carbon black 2 (Sevacarb MT made by Colombia Carbon Co., Ltd.) were employed in the backcoat coating material.

Sample 6

Tape sample was prepared under the same conditions as in Sample 3 with the exception that the magnetic coating material was dispersed for three hours.

Sample 7

Tape sample was prepared under the same conditions as in Sample 1 with the exceptions that the magnetic coating material was dispersed for three hours and 15 mass parts of carbon black 2 (Sevacarb MT made by Colombia Carbon Co., Ltd.) were employed in the backcoat coating material.

Evaluation Methods

Method of Measuring Pits on the Magnetic Layer Surface by AFM

Three-dimensional surface roughness was measured with Nanoscope III made by Digital Instruments in U.S.A., and the number of pits having a depth of ⅓ or more of the minimum bit length recorded respectively in Table 2 from the average plane of magnetic layer surface roughness was measured.

Here, the term "average plane" refers to the plane at which the volume of protrusions and the volume of indentations in the measurement surface are equal. The measurement was conducted over a 100 $\mu$m×100 $\mu$m (10,000 $\mu m^2$) range. The SRa was measured as the center surface average roughness [nm] within the above measurement range.

SNR Measurement

SNR measurement was conducted with a drum tester. A 1.5 T MIG head was employed to write a signal with a recording wavelength of 0.55 to 0.2 $\mu$m. The output obtained by spectrum analyzer of a signal reproduced with an MR head and the noise level at bandwidths of 0.05 $\mu$m or more converted into wavelength were measured to obtain the SNR value. At a recording wavelength of 0.55 $\mu$m, an SNR equal to or greater than 25 dB was considered good; at a recording wavelength of 0.3 $\mu$m, an SNR equal to or greater than 22 dB was considered good, and at a recording wavelength of 0.2 $\mu$m, an SNR equal to or greater than 12 dB was considered good.

TABLE 2

| Sample No. | Minimum recording bit length (nm) | Number of pits having a depth of ⅓ or more of bit length (pieces) | SRa (nm) | SNR |
| --- | --- | --- | --- | --- |
| Embodiment 5 | 1 | 275 | 6 | 4.5 | 28.0 |
| Embodiment 6 | 2 | 275 | 47 | 5.9 | 25.2 |
| Embodiment 7 | 3 | 275 | 0 | 3.8 | 30.0 |
| Embodiment 8 | 4 | 275 | 31 | 5.5 | 28.1 |
| Embodiment 9 | 5 | 275 | 71 | 5.7 | 25.0 |
| Embodiment 10 | 1 | 150 | 47 | 4.5 | 26.5 |
| Embodiment 11 | 2 | 150 | 95 | 5.9 | 22.4 |
| Embodiment 12 | 3 | 150 | 5 | 3.8 | 27.9 |

TABLE 2-continued

| Sample No. | Minimum recording bit length (nm) | Number of pits having a depth of ⅓ or more of bit length (pieces) | SRa (nm) | SNR |
|---|---|---|---|---|
| Embodiment 13 | 4 | 150 | 68 | 5.5 | 25.1 |
| Embodiment 14 | 1 | 100 | 87 | 4.5 | 12.9 |
| Embodiment 15 | 3 | 100 | 36 | 3.8 | 14.3 |
| Comparative Example 4 | 6 | 275 | 29 | 6.5 | 23.9 |
| Comparative Example 5 | 7 | 275 | 107 | 7.1 | 21.6 |
| Comparative Example 6 | 5 | 150 | 113 | 5.7 | 21.7 |
| Comparative Example 7 | 6 | 150 | 90 | 6.5 | 20.9 |
| Comparative Example 8 | 7 | 150 | 178 | 7.1 | 18.6 |
| Comparative Example 9 | 2 | 100 | 214 | 5.9 | 10.7 |
| Comparative Example 10 | 4 | 100 | 189 | 5.5 | 11.3 |

Evaluation Results

Table 2 shows that all of Embodiments 5 through 15, in which numbers of pits having a depth of ⅓ or more of the minimum recording bit length were equal to or less than 100 and a magnetic layer center surface average roughness SRa were equal to or less than 6.0 nm, had high SNRs.

Although Comparative Examples 4 and 7, which had center surface average roughnesses exceeding 6.0 nm due to short dispersion times of the magnetic coating material, had numbers of pits equal to or less than 100, they also had SRas exceeding 6.0 nm and low SNRs.

Comparative Examples 5 and 8, in which the dispersion time of the magnetic coating materials was short and the quantity of carbon black contained in the backcoat coating material was high, had numbers of pits exceeding 100, SRas equal to or greater than 6.0 nm, and low SNRs.

Comparative Example 6, which comprised a large quantity of carbon black in the backcoat layer, had an SRa equal to or greater than 6.0 nm, but also had a number of pits equal to or greater than 100 and a low SNR.

Comparative Example 9 was identical to the samples of Embodiments 6 and 11 and was used as an example of a recording wavelength of 0.2 μm (minimum recording bit length 100 nm). The center surface average roughness SRa was equal to or less than 6.0 nm, but the number of pits exceeded 100, and the SNR dropped.

Comparative Example 10 was identical to the samples of Embodiments 8 and 13 and was used as an example of a recording wavelength of 0.2 μm (minimum recording bit length 100 nm). The center surface average roughness SRa was equal to or less than 6.0 nm, but the number of pits exceeded 100, and the SNR dropped.

As described above, the present invention can provide a magnetic recording medium with a high SNR suited to use in recording and reproduction systems in which an MR head is mounted.

The present disclosure relates to the subject matter contained in Japanese Patent Applications No. 2001-229023 filed on Jul. 30, 2001 and No. 2001-359063 filed on Nov. 26, 2001, which are expressly incorporated herein by reference in its entirety.

What is claimed is:

1. A magnetic recording medium comprising a nonmagnetic layer comprising a nonmagnetic powder and a binder and a magnetic layer comprising a hexagonal ferrite powder and a binder in this order on a nonmagnetic support, wherein the number of pits having a depth of ⅓ or more of the minimum recording bit length present on a surface of said magnetic layer is equal to or less than 100/10,000 $\mu m^2$, the minimum recording bit length is about 50 to 500 nm, and the center surface average roughness of said magnetic layer surface SRa is equal to or less than 6.0 nm.

2. The magnetic recording medium according to claim 1, wherein said magnetic layer has on a surface, the number of pits having a depth as measured by Atomic Force Microscope of 50 nm or more being equal to or less than 100/10,000 $\mu m^2$.

3. The magnetic recording medium according to claim 1, wherein said nonmagnetic layer comprises at least carbon black and a binder composed of a radiation-setting resin and a thermosetting resin.

4. The magnetic recording medium according to claim 1, wherein said number of pits is equal to or less than 80 pits/10,000 $\mu m^2$.

5. The magnetic recording medium according to claim 1, wherein said number of pits is equal to or less than 50 pits/10,000 $\mu m^2$.

6. The magnetic recording medium according to claim 1, wherein said minimum recording bit length is ½ of the length of the shortest wavelength of a signal recorded by a system on which the magnetic recording medium is applied.

7. The magnetic recording medium according to claim 1, wherein said center surface average roughness SRa ranges from 1.0 to 5.0 nm.

8. The magnetic recording medium according to claim 1, wherein said center surface average roughness SRa ranges from 1.5 to 4.5 nm.

9. A method for use of the magnetic recording medium according to claim 1, wherein a MR head is employed during recording and reproduction.

10. A magnetic recording and reproducing method comprising the steps of:

providing a magnetic recording medium comprising a nonmagnetic layer comprising a nonmagnetic powder and a binder and a magnetic layer comprising a hexagonal ferrite powder and a binder in this order on a nonmagnetic support, and, optionally, a backcoat layer comprising a selected type and quantity of course particles, wherein the center surface average roughness of said magnetic layer surface SRa is equal to or less than 6.0 nm, writing a signal of a selected recording wavelength or range of recording wavelengths and of a selected track width on the magnetic recording medium using a head, and reproducing the recorded signal using an MR head having a selected track width, so as to achieve a number of pits having a depth of ⅓ or more of the minimum recording bit length present on the surface of said magnetic layer of 100/10,000 $\mu m^2$ or less.

11. The magnetic recording and reproducing method of claim 10 wherein the minimum recording bit length is from about 50 to 500 nm.

* * * * *